United States Patent
Blackburn et al.

(10) Patent No.: US 7,171,606 B2
(45) Date of Patent: Jan. 30, 2007

(54) SOFTWARE DOWNLOAD CONTROL SYSTEM, APPARATUS AND METHOD

(75) Inventors: Dennis Blackburn, Suwanee, GA (US); Kenneth Osburn, Suwanee, GA (US)

(73) Assignee: Wegener Communications, Inc., Duluth, GA (US)

( * ) Notice: Subject to any disclaimer, the term of this patent is extended or adjusted under 35 U.S.C. 154(b) by 391 days.

(21) Appl. No.: 10/400,972

(22) Filed: Mar. 25, 2003

(65) Prior Publication Data

US 2004/0193998 A1  Sep. 30, 2004

(51) Int. Cl.
G11C 29/00 (2006.01)

(52) U.S. Cl. .................... 714/763; 714/6; 714/13; 714/758; 717/173

(58) Field of Classification Search ............ 714/758, 714/763, 805, 774, 6, 13; 717/173
See application file for complete search history.

(56) References Cited

U.S. PATENT DOCUMENTS

| | | | |
|---|---|---|---|
| 4,761,785 A * | 8/1988 | Clark et al. ............... 714/805 |
| 4,985,895 A | 1/1991 | Pelkey ..................... 371/37.7 |
| 5,019,910 A | 5/1991 | Filmer ...................... 358/188 |
| 5,367,571 A | 11/1994 | Bowen et al. .............. 380/20 |
| 5,404,505 A | 4/1995 | Levinson ................... 395/600 |
| 5,421,017 A | 5/1995 | Scholz et al. .............. 395/700 |
| 5,440,632 A | 8/1995 | Bacon et al. ............... 380/20 |
| 5,550,576 A | 8/1996 | Klosterman ................ 348/6 |
| 5,684,525 A | 11/1997 | Klosterman ................ 348/12 |
| 5,694,334 A | 12/1997 | Donahue et al. ........ 364/514 R |
| 5,712,969 A | 1/1998 | Zimmermann et al. 395/182.03 |
| 5,717,887 A | 2/1998 | Leslie ....................... 395/439 |
| 5,764,773 A | 6/1998 | Nishiura ................... 380/49 |
| 5,828,945 A | 10/1998 | Klosterman ............... 455/4.2 |
| 5,892,767 A | 4/1999 | Bell et al. ................ 370/432 |
| 5,917,915 A | 6/1999 | Hirose ...................... 380/49 |
| 5,923,362 A | 7/1999 | Klosterman ............... 348/12 |
| 5,930,515 A | 7/1999 | Ducharme et al. ......... 395/712 |
| 5,987,518 A | 11/1999 | Gotwald ................... 709/230 |

(Continued)

FOREIGN PATENT DOCUMENTS

EP    0 993 183 A2    4/2000

(Continued)

OTHER PUBLICATIONS

MPEG-2 Transport Stream Description; Rev. 2.29.00, Compiled by Ron Wallace, 35pp.

(Continued)

*Primary Examiner*—Albert Decady
*Assistant Examiner*—Esaw Abraham
(74) *Attorney, Agent, or Firm*—Robert C. Haldiman; Husch & Eppenberger LLC (57) ABSTRACT

A system and method for downloading software updates for receivers of broadcast content data distribution has multiple memories for storing the updated version of code as well as a backup copy of the prior version of code. Code is replaced with an updated version when the updated version passes a series of checks. Thereafter the updated version is designated the current version. Thereafter the backup version is changed. The method updates operational code without interrupting the execution of regular receiver functionality, such as the playing of audio and/or video. The system provides for updating operational code in option cards.

56 Claims, 6 Drawing Sheets

U.S. PATENT DOCUMENTS

| | | | |
|---|---|---|---|
| 5,987,519 A | 11/1999 | Peifer et al. | 709/230 |
| 6,072,983 A | 6/2000 | Klosterman | 455/4.2 |
| 6,094,671 A | 7/2000 | Chase et al. | 709/201 |
| 6,101,180 A | 8/2000 | Donahue et al. | 370/352 |
| 6,113,652 A | 9/2000 | Lysik et al. | 717/11 |
| 6,182,187 B1 | 1/2001 | Cox et al. | 711/5 |
| 6,262,982 B1 | 7/2001 | Donahue et al. | 370/352 |
| 6,266,339 B1 | 7/2001 | Donahue et al. | 370/432 |
| 6,266,810 B1 | 7/2001 | Tanaka et al. | 717/11 |
| 6,317,162 B1 | 11/2001 | Matsumoto | 348/553 |
| 6,331,876 B1 | 12/2001 | Koster et al. | 348/725 |
| 6,332,198 B1 * | 12/2001 | Simons et al. | 714/6 |
| 6,343,379 B1 | 1/2002 | Ozawa et al. | 725/63 |
| 6,378,129 B1 | 4/2002 | Zetts | 725/94 |
| 6,385,647 B1 | 5/2002 | Willis et al. | 709/217 |
| 6,393,585 B1 | 5/2002 | Houha et al. | 714/23 |
| 6,401,242 B1 | 6/2002 | Eyer et al. | 725/35 |
| 6,411,616 B1 | 6/2002 | Donahue et al. | 370/352 |
| 6,470,496 B1 | 10/2002 | Kato et al. | 717/173 |
| 6,487,721 B1 | 11/2002 | Safadi | 725/36 |
| 6,493,871 B1 * | 12/2002 | McGuire et al. | 717/173 |
| 6,615,404 B1 * | 9/2003 | Garfunkel et al. | 717/173 |
| 2001/0003846 A1 | 6/2001 | Rowe et al. | 725/47 |
| 2001/0005902 A1 | 6/2001 | Bacon et al. | 725/50 |
| 2001/0043573 A1 | 11/2001 | Kelly | 370/316 |
| 2001/0044934 A1 | 11/2001 | Hirai et al. | 717/11 |
| 2002/0000831 A1 | 1/2002 | Smith | 326/39 |
| 2002/0007494 A1 | 1/2002 | Hodge | 725/109 |
| 2002/0010936 A1 | 1/2002 | Adam | 725/91 |
| 2002/0010938 A1 | 1/2002 | Zhang et al. | 725/95 |
| 2002/0026645 A1 | 2/2002 | Son et al. | 725/117 |
| 2002/0034179 A1 | 3/2002 | Ollikainen et al. | 370/389 |
| 2002/0035730 A1 | 3/2002 | Ollikainen et al. | 725/93 |
| 2002/0047899 A1 | 4/2002 | Son et al. | 348/114 |
| 2002/0053073 A1 | 5/2002 | Shimamoto | 717/168 |
| 2002/0071434 A1 | 6/2002 | Furukawa | 370/392 |
| 2002/0105976 A1 | 8/2002 | Kelly et al. | 370/519 |
| 2002/0108124 A1 | 8/2002 | Sato | 725/136 |
| 2002/0108128 A1 | 8/2002 | Lash et al. | 725/148 |
| 2002/0120885 A1 | 8/2002 | Choi et al. | 714/38 |
| 2002/0124243 A1 | 9/2002 | Broeksteeg et al. | 717/168 |
| 2002/0131428 A1 | 9/2002 | Pecus et al. | 370/401 |
| 2002/0136218 A1 | 9/2002 | Cardoso, Jr. | 370/394 |
| 2002/0138852 A1 | 9/2002 | Reynolds et al. | 725/136 |
| 2002/0144291 A1 | 10/2002 | Smiley et al. | 725/120 |
| 2002/0150102 A1 | 10/2002 | Janko et al. | 370/392 |
| 2002/0152467 A1 | 10/2002 | Fiallos | 725/50 |
| 2002/0163935 A1 | 11/2002 | Paatela et al. | 370/466 |
| 2002/0184339 A1 | 12/2002 | Mackintosh et al. | 709/218 |
| 2002/0184642 A1 | 12/2002 | Lude et al. | 725/105 |
| 2002/0191640 A1 | 12/2002 | Haymes et al. | 370/466 |
| 2003/0005037 A1 | 1/2003 | Aija et al. | 709/203 |
| 2003/0005444 A1 | 1/2003 | Crinon et al. | 725/50 |
| 2003/0009769 A1 | 1/2003 | Hensgen et al. | 725/131 |
| 2003/0012190 A1 | 1/2003 | Kaku et al. | 370/389 |
| 2003/0016664 A1 | 1/2003 | MeLampy et al. | 370/389 |

FOREIGN PATENT DOCUMENTS

| | | |
|---|---|---|
| JP | 2001136085 | 5/2001 |
| WO | WO 98/54642 | 12/1998 |

OTHER PUBLICATIONS

Optibase MGW 3100 Brochure (2001).

Optibase "Bridging DVB and IP Networks With Optibase's MGW 3100".

* cited by examiner

Figure 6

# SOFTWARE DOWNLOAD CONTROL SYSTEM, APPARATUS AND METHOD

CROSS-REFERENCE TO RELATED APPLICATIONS

None.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

This invention is in the field of software downloading through a broadcast digital media distribution network, particularly as downloaded to cards and especially option cards.

2. Related Art

Distribution networks for digital information such as video, audio, Internet data or voice communications continue to grow increasingly sophisticated. Receivers of such digital information that play or retransmit information must be capable of receiving not only content data, but also functional codes executable for the control and play of an expanding array of user options and interactivity. Executable application programs and operational code are stored not only in receiver hardware, but in cards which may take the form of option cards, audio or video cards, or storage cards. Application programs include those that communicate between a receiver mother board and an option card, between either a receiver or a card and either an audio or video decoder or for either to read or write flash memory. Application programs may include such functions for Internet or voice communications, as well as audio and video distribution.

Operational code and functional software in this field, as in other fields, is subject to frequent updates, changes, new versions, patches, debugging, added features and the like. Downloading new software and code by transmission through the distribution system, such as transmission by satellite, is more efficient, economical and convenient than other methods of software downloading. However, transmitted downloading of software to systems such as video and audio receivers may create, in many circumstances, difficulties with continuity of service, play and with convenience of access for users. Particularly, operational software may become non-functional during the execution of a download. A period of non-functionality interrupts service and inconveniences users. Moreover, it risks the loss of both operational code and content data should the downloading process itself be interrupted, as for example by a power failure. There is a need in the art for a system for downloading functional software that does not interrupt the use of that operational software, and does not risk loss of the software or the content upon which it acts. There is a need for a system that allows the new operational code to be verified for accuracy before being loaded for use. There is a need for backing up the operational codes so that a function may continue after an interruption in a download. Finally, there remains a continuing need for economy, especially in respect to minimizing the costs of hardware components. All these needs exist in general for receivers that execute operational code, but also exist, in particular for option cards that supplement the services of the receivers into which they are installed.

Most digital content data distribution systems work according to common familiar concepts. Multiple content data streams, video, audio or data, are divided into packets, multiplexed, transmitted and routed for use to various receivers. The MPEG protocols are illustrative of the class, and are referred to herein as characteristic of the embodiments discussed herein. The Moving Picture Experts Group (MPEG) is the expert group of the International Organization for Standardization (ISO) that has defined the MPEG standard protocols, such as the MPEG-2 standard (ISO/IEC 13818). Other protocols such as MPEG1 or DSS are alike in function although they vary in detail. Each standard is known in the art.

At some point, the video and audio content data, and other digital information must be multiplexed together to provide encoded bitstreams for delivery to the target destination. Standards set forth the manner in which video and audio are synchronized and multiplexed together, how frames are defined, how data is compressed, various syntax elements, the decoding process, and other information related to the format of a coded bitstream. Typically, video and audio data are encoded at respective video and audio encoders, and the resulting encoded video and audio data is input to an MPEG Systems encoder/multiplexer. This Systems multiplexer can also receive other inputs, such as control instructions, management information such as authorization identifiers, private data bitstreams, and time stamp information. The resulting coded, multiplexed signal is referred to as the MPEG transport stream.

The software downloads discussed herein may be transmitted among the transport stream or transmitted on a separate channel. Control instructions such as those disclosed in U.S. Pat. No. 4,985,895 to Pelkey, may be used to identify receivers to which downloads are directed.

The video and audio encoders provide encoded information to the Systems multiplexer in the form of an "elementary stream". These elementary streams are "packetized" into packetized elementary streams which are comprised of many packets. Each packet includes a packet payload corresponding to the content data to be sent within the packet, and a packet header that includes information relating to the type, size, and other characteristics of the packet payload. Packets are frequently configured to be 256 bytes in size.

Elementary stream packets from the video and audio encoders are mapped into transport stream packets at the Systems encoder/multiplexor. Each transport stream packet includes a payload portion which corresponds to a portion of the elementary packet stream, and further includes a transport stream packet header. The transport stream packet header provides information used to transport and deliver the information stream, as compared to the elementary stream packet headers that provides information directly related to the elementary stream. Each transport packet header includes a packet identifier (PID) to identify the digital program or elementary stream to which it corresponds. Within the transport packet header is a packet identifier (PID), which is a 13-bit field used to identify transport packets which carry elementary stream data from the same elementary stream, and to define the type of payload in the transport packet payload.

SUMMARY OF THE INVENTION

The present invention is a software download control system particularly for option cards, that allows an operational code to be downloaded, verified and loaded for operation when the hardware is able to receive it without interrupting function.

In the present invention content data distribution receiver accommodating a card accepts a transmission of downloaded software, whether the card is installed or not. The receiver verifies that the downloaded code is properly transmitted and received. After verification, the code is stored in a memory of the receiver, as for example a flash memory.

When the receiver is powered up, it checks for the presence of an option card. If the card is present, the receiver checks the code version currently loaded for running in the card. If the code version in the card is different from the code version downloaded, the new software is loaded to the card.

Loading of the software update from the receiver memory to the card occurs on a basis of the card's availability relative to the card's execution of its normal tasks. If loading the new software into the card occurs shortly after power up, this process may be entirely executed in a short amount of time, for example a number of seconds.

The software download control system of the present invention may also load software into a option card that is already functioning. In that case, blocks of downloaded code are received on an as-available basis. The software is sent to a FIFO and buffer in the card for loading into a card memory through a processor. The software is sent in blocks which may be equivalent in size to packets or memory segments. When the processor is not executing normal tasks, such as video or audio display, it accepts the software. When the processor is functioning on content, it does not accept the software blocks. The software is then sent again later starting with the last rejected block. Accordingly, the compilation of the multiple segments of code may take a longer period of time, such as a number of hours, before all the segments of new code have been transferred.

After transfer is complete, the code is again checked for integrity and then loaded into the card's flash memory and marked as "untested." The new operational code is then checked to insure that it is performing correctly. Thereafter it is marked as the current code version and the old code version is deleted from both card's memory and receiver's memory. In this fashion, operational software is downloaded without interrupting concurrent execution of the function of the cards.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION OF THE PREFERRED EMBODIMENTS

Figure 1:
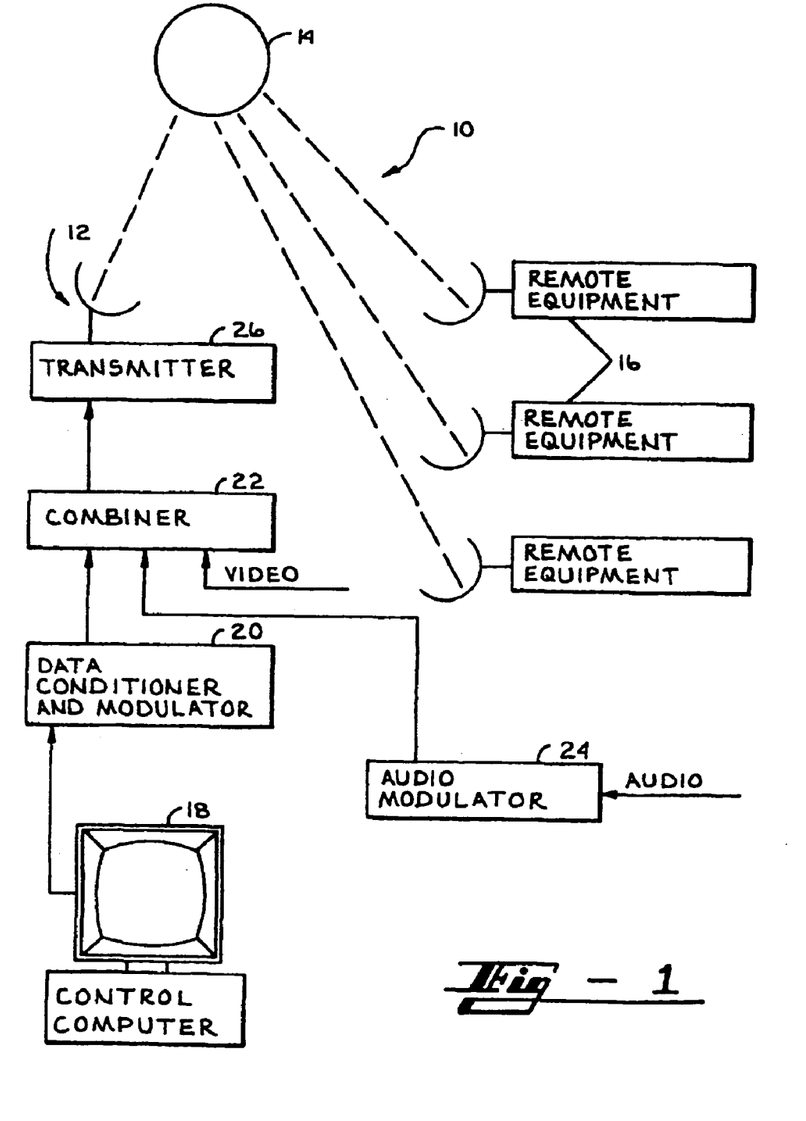
FIG. 1 is a block diagram illustrating a satellite distribution network.

Referring now to the figures in which like reference numbers correspond to like elements, FIG. 1 is a block diagram of a satellite distribution network for content data such as music. In the satellite distribution network 10, content data is generated at the uplink 12 and transmitted along with control instructions via the satellite 14 to terminal receivers 16. Uplink 12 includes a control computer 18, a conditioning and modulation circuit 20 and a combiner circuit 22 for receiving audio and/or video signals. Combined audio and/or video content, together with control instructions, are output from combiner 22 to transmitter 26 whereupon they are uplinked to satellite 14. Satellite 14 retransmits the content data and control instructions in a broadcast received by remote equipment 16. Remote equipment will include a terminal having a receiver/decoder. Terminals incorporated in the present invention will include memory control system circuitry that works in conjunction with the content data and control instructions received.

In the embodiment depicted in the following figures, broadcast content data is music transmitted according to the MPEG protocol in asynchronous transfer mode. It will also include commercial data such as advertisements. Those skilled in the art will appreciate that other content data, for example video, Internet or voice, transmitted according to other protocols and in other modes will also benefit from the incorporation of the code download system of the present invention and are considered to be within the scope of the present invention. Software, application programs or code will also be understood to include code enabling interoperability with and communication through various broadcast communication devices, such as PCs, PDAs, radios, televisions, wireless telephones and the like.

Figure 2:
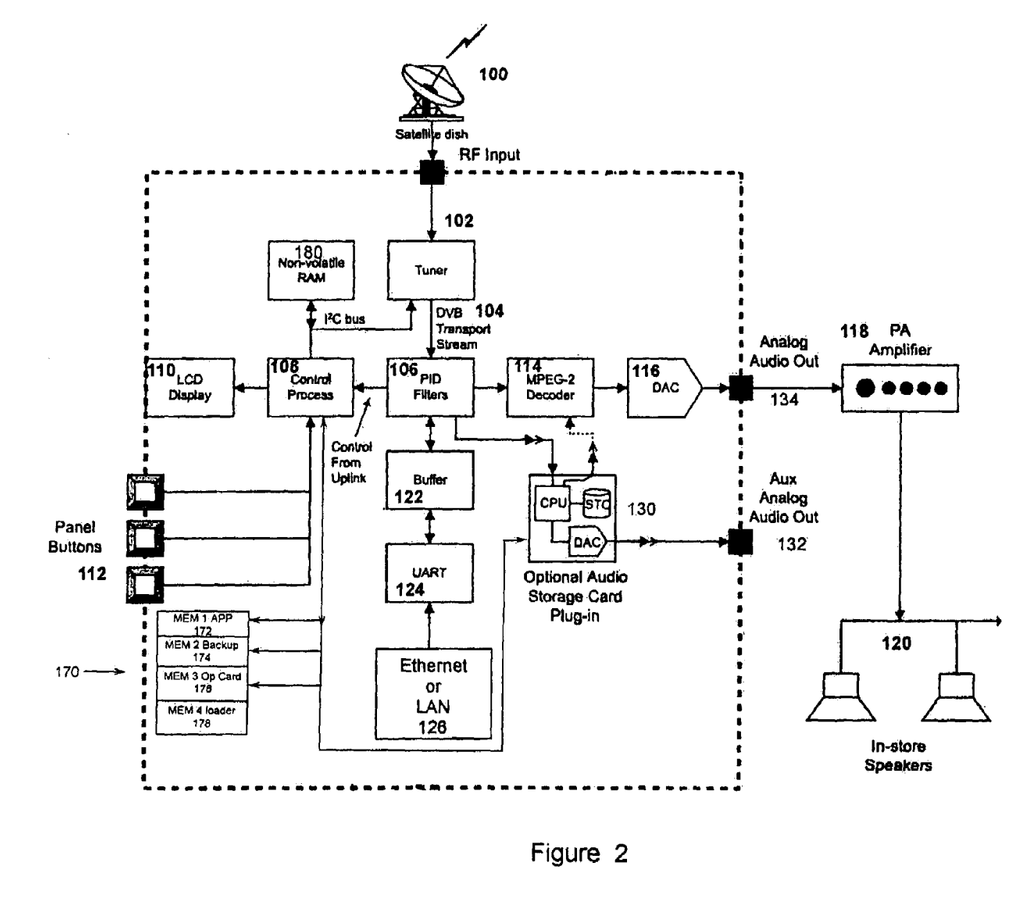
FIG. 2 is a block diagram of an integrated receiver/decoder unit.

FIG. 2 is a block diagram illustrating the general configuration of an integrated receiver/decoder (IRD). Remote equipment 16 includes a satellite dish for receiving the broadcast signal, 100. Multiple channels connect the satellite dish 100 with tuner 102 for receipt of one or more streams of data through radio frequency input. From tuner 102 digital video bus 104 allows transfer of data to packet identification filter processor 106.

Packets containing control instructions, software downloads or other non-content functional code may be forwarded to control processor 108. Control processor 108 may be interactive with a user through an LCD display 110 and panel buttons 112. Content data packets, for example music packets, are received by an MPEG 2 decoder 114. After decoding, content data is forwarded to digital analog converter 116 where it is output to a standard amplifier 118 for playing the music content over speakers 120.

Packets are also forwarded to buffer 122 and therethrough interconnected with a synchronous transfer mode reassembler UART 124. From there an ethernet or LAN connection is available.

The option card of the present invention is indicated in FIG. 2 at 130. The system is preferably on a separate option card, but may be an integral part of the main circuit board, or a module in communication with the main circuit board. The system is detailed in FIG. 3. The memory control system may output to its own analogue out 132 or back to decoder 114 and analogue out 134.

Figure 3:
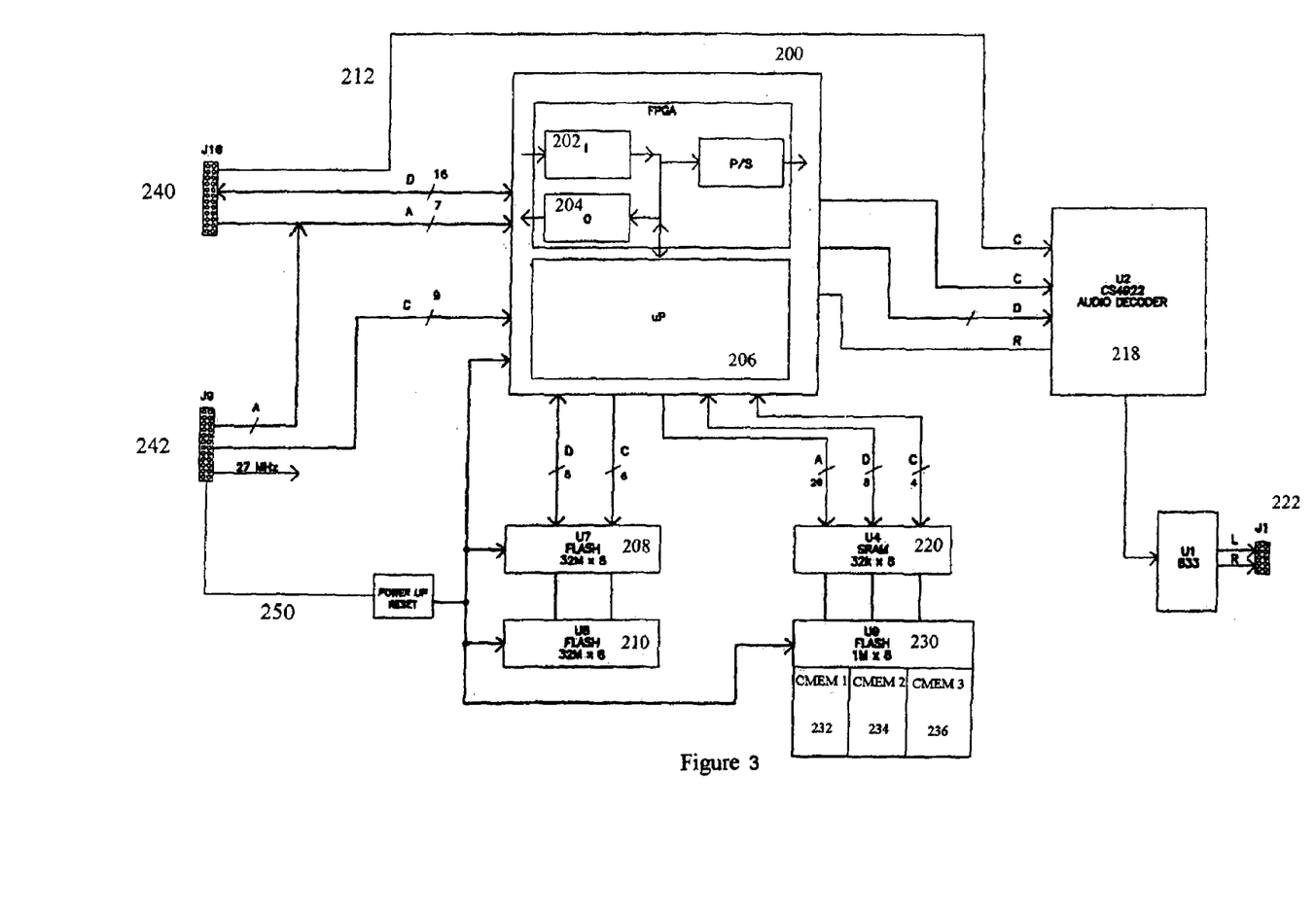
FIG. 3 is a block diagram of an option card.

FIG. 3 is a block diagram of one embodiment of an option card 130 system according to the present invention. In the depicted embodiment a Triscend™ model Configurable System On a Chip has been used. The same hereinafter disclosed logic executed by CSOC chips, or other combinations of micro processors and buffers will be understood to be within the scope of the present invention. These will be understood to include SOCs, systems on chips, FPGAs, dedicated ASICs, or any chip including a microprocessor and configurable gates, or any chip including a microprocessor and gates already configured as described herein.

In the embodiment depicted in FIG. 3, CSOC chip 200 is a field programmable gate array configured to include an input buffer 202 and an output buffer 204. In the depicted embodiment each buffer may have at least a 2000 byte capacity but not more than 8000 bytes. Other embodiments at other data transfer rates may have other buffer capacities. The chip also includes micro processing capabilities 206.

Through CSOC chip 200 at least two flash memories and an SRAM (or other types of RAM) are controlled. Content data is stored in flash memory 208. Additional flash memories 210 may be added to expand capacity. Operational code including application programs are stored in flash memory 230. Upon power up, the operational code is loaded into SRAM 220.

The remote equipment includes a circuit 212 from the clock oscillator in the receiver depicted in FIG. 2. The MPEG audio decoder 218 decodes and synchronizes audio at a standard frequency (27 MHz), and circuit 212 supplies that to decoder 218. From there audio is output to speakers 222.

In order to execute the method in the system of the present invention, a receiver/decoder depicted in FIG. 2 includes a memory 170. Either a single memory configured in different portions, or separate memories may be used. Flash memory is depicted, but any type of memory is considered to be within the scope of the present invention. Memory 170 is divided into a first memory 172 (MEM1) for storing a current version of an application program. Memory 170 also has a second portion 174 (MEM2) for storing a backup copy of the same application program stored in the first memory 172. A third memory 176 (MEM3) stores an application program for an option card. A fourth memory 178 (MEM4) stores a loading program.

In the option card depicted in FIG. 3, the memory 230 is divided into a first card memory 232 (CMEM 1) a second memory 234 (CMEM 2) and a third memory 236 (CMEM 3). The third memory 236 is a pre-configured portion of a flash memory or any other type of memory or memory space wherein a separate loader program is stored. First memory 232 and second memory 234 store operational code, i.e. at least one application program.

In normal operation, the IRD depicted in FIG. 2, upon power-up, loads into RAM 180 all necessary application programs out of the first IRD memory 172. Likewise, if and when an option card 130 is present in the IRD, upon power-up the card will load into SRAM (or SDRAM) 220 all applicable application programs out of its first memory 232 or second memory 234. The memories and method for using memories disclosed herein are scalable, and accordingly any of the designated memory portions of memory 170 in the IRD or memory 230 in the option card may be expanded to include further memories for storing further code and application programs. Any number of additional memory portions may be configured.

From time to time in the normal operation of the content data distribution system, new versions of software, that is new versions of application programs embodied in operational code, will be transmitted to all receivers, groups of selected receivers, or, if desired, an individual receiver. Control of receipt of such downloads is governed by control instructions as disclosed in U.S. Pat. No. 5,985,895 Pelkey, which is incorporated by reference herein. New versions of application programs supplant old versions. If desired, older versions of application programs may be retransmitted for replacing a newer version, as for example to respond to problems with a new version. In either case, a newly transmitted version of an application program that is different from the version in first memory 172 of the IRD or the current version in memory 232 or 234 of the option card will be called a new version or updated version if it is different from the current version held in the memories. Updated versions of application programs may be downloaded by transmission to the IRD, or to the option card through the IRD, or to both.

In a typical broadcast system for content data distribution, software updates will be transmitted several times a day, every few hours. In each transmission, the same code updates are repeated, for example three times. In this manner interruptions in transmission, like rain showers, that produce faulty receipt may be automatically corrected by receipt of the code update on the next transmission.

When new application programs are transmitted, they are present in the normal transport data stream along with a Download Prepare Command which precedes the actual new version of software. The Download Prepare Command will include the size of the new version of the code, will identify the particular program being updated, will identify the particular model of receiver or IRD being updated and will designate a type for the new software version. The designated type will be either an application program for the first memory 172, an application program backup for the second memory 174, or an option card update for the third memory, 176.

When a new version of software to be used by the IRD is transmitted, the Download Prepare Command is received by the IRD first. It is processed in RAM by the application code running there. The Download Prepare Command may then be read by a running control program, by other application programs so configured, or by a separate program configured to receive Download Prepare Commands.

Throughout the disclosed embodiment of the present system a number of validity checks are run. Optionally, other embodiments considered to be within the scope of the present invention may omit, change, repeat, or add to the various validity checks described in the depicted embodiment. The first check is executed by RAM upon the receipt of a Download Prepare Command. If the new software version received is for the IRD application, the currently loaded application in the RAM will check the second memory 174 for validity of the backup code.

The RAM 180 receives packets according to the known transport data stream protocol. Optionally, RAM may regroup received packets into blocks. The size of the block is limited by the size of the memory segments. For example, a common flash memory component is easily divided into segments of 64 kb. Accordingly, when enough packets have been assembled to comprise the first block of the new version of the application program, such a block may be loaded into the first segment of the first memory 172. It is also known to those with skill in the art, that building blocks for transfer into memory are scalable, and can be as small as one byte and as large as the memory capacity. In the depicted embodiment, however, packets, such as the 256 byte packets as received in the MPEG protocol transport data stream, are forwarded for loading in flash memory as packets.

Each packet has a Cyclic Redundancy Check (CRC) check embedded for checking itself upon receipt. A CRC check is a technique known to those of skill in the art. When all the packets have been loaded into first memory 172, a second CRC check is run on the entire download.

Each packet is loaded into memory with an offset address. For example, if a first packet is loaded into the first 256 bytes of memory, the second packet will be addressed to load beginning at memory byte space 257, the third packet at 512, etc.

It is common in satellite transmission or terrestrial broadcast transmission of content data for atmospheric irregularities to interfere with transmissions. For example, a rain shower can cause certain packets to be lost. For this reason, in the depicted embodiment multiple versions of many transmitted code groups are sent. In the case of operational code, the same version updating an application program will be sent multiple times, for example three times. If a CRC check indicates that the updated application program now loaded in the first memory 172 is not valid, the previous versions of the application program in question remains loaded in RAM and the IRD will continue to run on that version. When the next updated version transmission is received, the above-described process repeats and the first memory 172 is reloaded with the retransmitted update new version of the application program.

In the event of a power loss or other mishap at the IRD causing a loss of an application program loaded in RAM, the IRD can be powered up again and the loading software—in the depicted embodiment stored in fourth memory 178—will load a backup version of the code, which is the previous version as opposed to the transmitted update version, from backup memory 174. Thereafter, when a retransmitted update version of the application program is transmitted, it will be loaded into the first memory 172 and replace the invalid update version of the application program that was loaded before the power loss. Optionally, this reloading of the first memory 172 may be a complete replacement of every block of code, even if only a few blocks are corrupted. However, in the depicted embodiment, the application program will forward each retransmitted packet of code, as described above. Packets are loaded at their offset addresses. If the packet already existing in the first memory 172 is marked as valid, it has remained in first memory 172. Corrupted packets of code are simply dropped when their individual packet CRC indicates that they are corrupt. In this case the offset address for that packet is left empty. At the next transmission, the newly received, retransmitted packet of the new version of code will be loaded at that designated memory address for it which has remained blank due to the corruption of the first transmission. In this fashion, where a flash memory is being used as in the depicted embodiment, multiple overwrites of flash memory are avoided. Those with skill in the art will recognize that flash memory has a limited life cycle for rewrites. Accordingly, the presented depicted embodiment preserves the life span of a flash memory.

The application programs in all versions will include a marker byte. If the final CRC for the completed download of all packets indicates that two updated application program is faulty, it is marked as invalid ("00").

If the newly loaded version of an application program in first memory 172 passes its CRC test and is found to be valid, it needs to be loaded into RAM so that the new application version can be put into operation. In the depicted embodiment, a periodic reset signal is constantly sent. Periodic reset techniques are commonly known as "watchdog" systems. If there is no valid update version of an application program in first memory 172, this reset signal is instructed to reset its repeat time for the next period. However, when there is a valid update version of an application program in first memory 172, the reset signal is accepted and the RAM is emptied and reloaded with the valid new version of the application program.

At this point, another optional check is executed by the loading code. If the new version of software loaded into RAM fails to function, the reset automatically moves to loading the backup version of code, still the previous version, from second memory 174.

In the IRD, application programs are loaded separately via separate transmissions into the first memory 172 for application memory and the second memory 174 for backup memory. The advantage of separate updating for application and backup memories is that if operational bugs, as opposed to download faults, appear in a new code version after a few days of use, a known, functioning backup is available. While immediately erasing the backup code and replacing with the newly updated code is considered to be within the scope of the present invention, in the depicted embodiment, backup updates are separate.

If either of the preceding CRC check or run check indicates invalid code, an operator of the IRD may, optionally, be notified by an indicator on an LED on an operator panel. In the depicted embodiment, a "check code version" indicator may be displayed. Code versions are numbered, and typically a display would show current application code version number, a backup application code version number and, also, an option card version number. When an invalid version of code exists in one of the memories, it may be displayed as such, as for example with XXX. At this point, the operator has the option of signaling through any known means to the transmitter of content data that he has a faulty version. Thereafter a new version of code may be directed to that specific IRD, which will be identified by serial number. However, in the depicted embodiment, new code is transmitted every few hours every day. Accordingly, if a download is faulty, a new download will occur automatically to correct it.

The Download Prepare Command identifies the version number of the application program being transmitted. If that version number is the same as the version number running in RAM, the Download Prepare Command and subsequent transmission of application code is ignored.

The downloadable software updating of the present invention may also be executed to update operational code used by and functioning in a peripheral or integrated module, such as the option card depicted in FIG. 3. It is within the scope of the present invention that the software update techniques disclosed herein may be used to update software and hardware other than option cards, and may be included in circuitry on a motherboard working in tandem with the previously described IRD functions, with a supplemental board or update board working with or within the IRD, or with a series of IRD's for servicing multiple users. However, he depicted embodiment is an option card such as an audio card. Moreover, any operational code manipulating, processing, controlling or otherwise operationally engaged with distribution of content data, most typically audio and visual data but also including data such as that distributed over the Internet and voice communications, is considered to be within the subject matter benefiting from the present invention.

Downloading code from the IRD to an option card differs from downloading from the satellite to the IRD in at least two consequential respects. First, there is two way communication between the card and IRD. Second, the likelihood that communication between a card and receiver will be corrupted is much lower than it is for communication between a satellite and receiver. In light of these differences, the card download techniques of the present invention optimize the economy of card downloading by allowing less expensive components to be used.

When a software update destined for use in an option card is transmitted, it is received into the IRD and processed by RAM 180 as disclosed above. Then it is loaded into the third memory 176 for holding option card software updates. As described above, a CRC check is run. If the option card update stored in third memory 176 is faulty, it is simply held there until the next transmission of the software update when it is then reloaded as described above.

The version of an application program held and running in an option card is checked on power-up, and is also periodically checked. On power-up, the IRD application programs in RAM check for the presence of a card, as inserted in the IRD according to known techniques. If it is detected that a card is present, the version number of the application program loaded in the card is checked. If the application program version in the card is different from that stored in third memory 176, an Application Code Preparation Message is sent from the IRD RAM to the card.

The status of the option card at this point of the process is as follows: a current version of an application program is stored in first card memory 232 (CMEM 1). The same current version of the application program is stored in second card memory 234 (CMEM 2). This version of the code has been loaded from the first card memory 232 to SRAM 220 for operation. As with the IRD, loading code functional to load application programs is stored independently in third card memory 236 in the depicted embodiment. Optionally, loading functionality may be incorporated within application programs, control programs, or stored elsewhere.

At least one application program achieves the task of the card, which, in the depicted embodiment, is to play music. The card processor receives content data (music) from the receiver through interface 240 (and, optionally, also interface 242). The music, video or other content data is received into an input buffer 202 acted upon as required by the processor 206 and output through output buffer 204. Content data is stored in a memory, such as flash memory 208. Content data memory capacity may or may not be expanded, as by second flash memory 210. In either case, the processor 206 may load content data into memory 208, may forward content data out to audio decoder 218 for playing, may recall content data from memory 208 and forward it to audio decoder 218 for play and may do these functions concurrently for uninterrupted audio play in real time. This process is described in U.S. patent application Ser. No. 10/350,930, filed Jan. 24, 2003 and incorporated by reference herein. Hence, while running to execute its designated purpose of distributing content data, the option card 130 and its processor 206 may not have the capacity to receive a downloaded operational software update without interruption of the execution of content data processing. In other circumstances, such as upon power-up, the card use may be open enough to accept an immediate complete download of the software update.

In the depicted embodiment, first card memory 232 and second card memory 234 act as an application memory and a backup application memory. Which of card memory 232 or card memory 234 act as the backup is interchangeable. For illustration purposes, first card memory 232 will be designated as the application memory in this example.

When the IRD finds that the application program version in first and second card memories 232 and 234 is different than the version of the application program stored in third IRD memory 176, and sends the application code preparation message, the second card memory 234 is erased. Accordingly, the current (old) version of the application program is held in first card memory 232, and is currently operating in SRAM 220. Once the second card memory 234 (backup) has been erased, the new version of the application program is transmitted from third IRD memory 176 to option card 130. Loading will be as described below. Once loaded into second card memory 234, another validity check is run. In the depicted embodiment this check is a simple checksum, as opposed to a CRC. As with the IRD, a periodic reset signal is sent. As in the IRD, this is the familiar "watchdog" power reset, depicted at 250 in FIG. 3.

Either on power-up, or upon receipt of the periodic reset signal, when the application program version in the second card memory 234 is marked as untested, and the version in the first card memory 232 or the SRAM 220 is marked as current, the loader program is executed to load the untested version of the application program from second card memory 234 into SRAM. Thereafter the code is executed for a period of time sufficient for checking its validity. The validity test run will test the updated code version for validity by testing its ability to receive and execute commands from the IRD motherboard, and its ability to play content data from content data memory 208. If the running code is determined to be valid and operational, it is marked as the primary or current code.

Marking is with hexadecimal text in a header byte in a known fashion. Invalid or non-operational code is marked as 00. Current code receives a separate pre-configured designation and new updates of code that are not yet tested receive a separate header designation. A separate designation of "obsolete" may be assigned to previous versions of code not yet erased. Once the updated code version now in second card memory 234 is loaded and operating in SRAM 220 has passed a run test, it is redesignated as the current code. The first card memory 232 may be erased then and reloaded with the current code version.

If the newly loaded code version from second card memory 234 fails to operate properly, it will be designated as not valid (with a hexadecimal 00). At this point, the second card memory 234 may be erased and reloaded, or it may be left as is and loaded with a retransmitted version of updated code from third IRD memory 176 upon the receipt of a next retransmission version of that code. Although it is within the scope of the present invention to immediately reload second card memory 234, where flash memories are being used, this is likely to lead to a cycle of reloading invalid code, which can rapidly consume the number of rewrites available in any flash memory life cycle. Accordingly, it is preferred to simply designate invalid code as invalid and let it continue to reside in second card memory 234 as invalid code until the next transmission of code is received in IRD third memory 176. Optionally, second card memory 234 may be reloaded upon the receipt of new code, or reloading may wait until the next power-up or next reset.

At the point at which the new version of an application program has been run in SRAM 220 and found to be valid, the copy in second card memory 234 is marked as the current code. Optionally, second card memory 234 may also be marked as the application memory. Thereafter the updated version of the application program in first card memory 232 may be designated as the backup memory. Hence card memories 232 and 234 are interchangeable in the sense that either may designated as the current application code with the other designated as backup.

When loading, the IRD RAM forwards new versions of option card application programs block by block. For the option card, blocks may be pre-configured in size according to the size of the input buffer 202, or the segmentation of the memory, or the size of a bus connecting the motherboard and card, or, as in the depicted embodiment, to correspond to the size of a FIFO gate configuration (not shown) in the CSOC 200. For example, the depicted blocks are 32 bytes in size.

If code updating is executed upon power-up, the option card 130 will not be occupied with executing its main function of processing content data, and accordingly the blocks may be immediately transferred through input buffer 202, processor 206 and output buffer 204 for loading into card memories 232 and 234. The upload will be rapid, that is, in a matter of seconds. The new code version, if valid, is then designated as current, loaded into SRAM and processing content data continues with the new version of the application program.

If, however, a new code version has been loaded into IRD third memory 176, while the option card 130 is executing its function of processing content data, it would be undesirable to interrupt the processing of content data for loading the updated version of the application program. Accordingly, the present invention provides for the updated application program version to be "trickled" through processor 206 into memory 230. Uploading by trickling allows the option card 130 to accept a new block of code as time permits, during appropriate gaps in the execution of processing content data. Since processing content data involves the use of input buffer 202 and output buffer 204, if a block of updated application program code is forwarded by the IRD to the option card 130 while the buffers are full with content data, the processor 206 does not acknowledge receipt of the block of updated code. When a "not acknowledged" or "NACK" signal is given, the RAM of the IRD will hold the next block of updated application program code, as well as holding a queue of code update blocks behind the current block, and re-transmit the current block at a later time. This process will repeat periodically until the transmitted block finds the intake buffer 202 available. At that point, processor 206 will direct the received current block out through output buffer 204 for loading into memory 230. The same process occurs for each transmitted block. In this fashion, if an application program is comprised of many blocks of code, the sequential blocks of code may be received and loaded into memory 230 across a significant amount of time, for example hours. Downloading operational code in this manner will not interrupt the processing of content data. Once the downloading of the code update is completed, the checks, resetting, re-designation and reloading of backup proceeds as described above.

Figure 4:
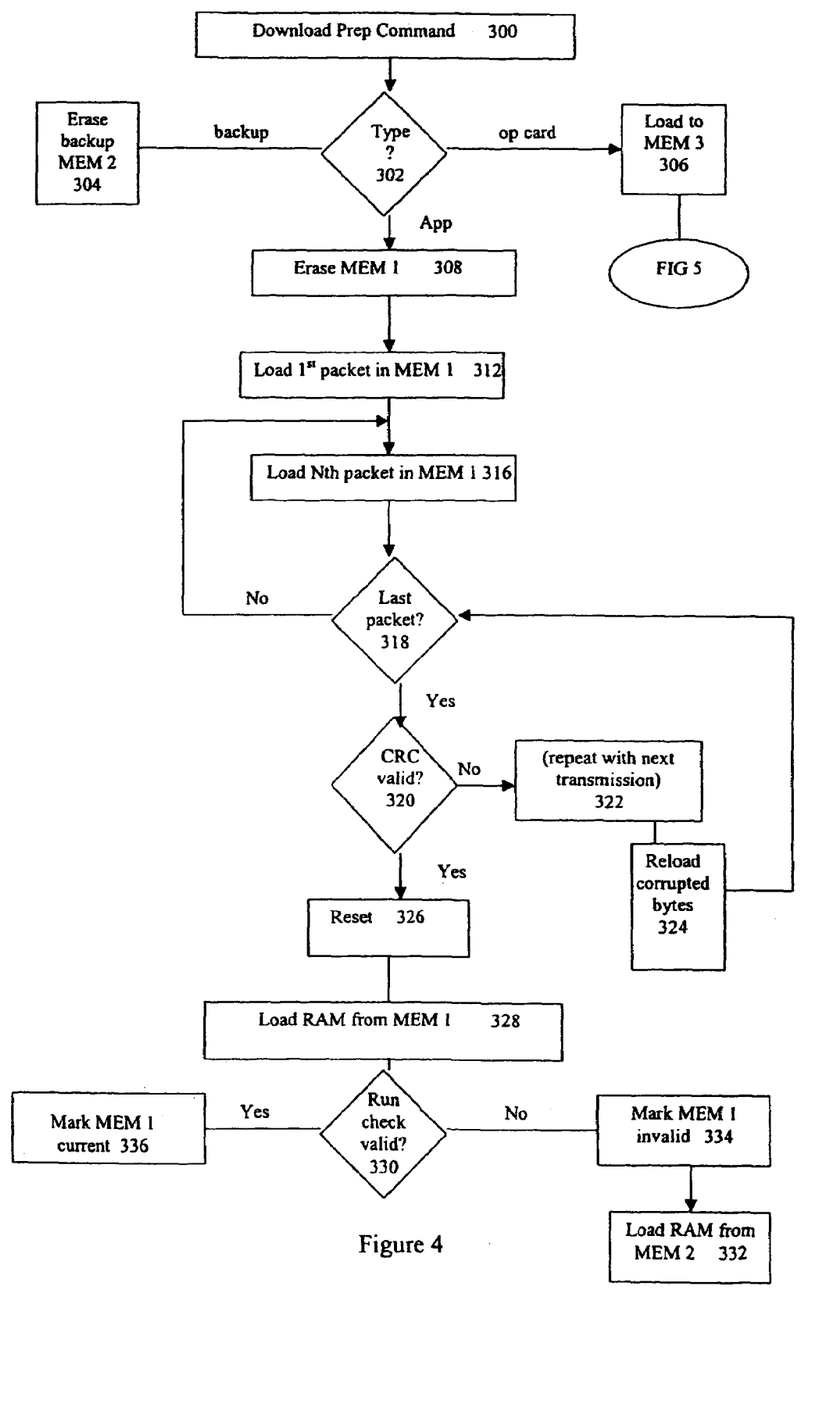
FIG. 4 is a flow chart for updating an IRD.

FIG. 4 is a flow chart of the IRD software update procedure. When a Download Preparation Command 300 is received from a satellite transmission by the IRD, the type of software upload is checked 302. If the software update is designated as a backup, memory 274 is erased and loaded with the backup code 304. Checking and designation procedure for backup code mirrors and is substantially similar to that for application code.

Figure 5:
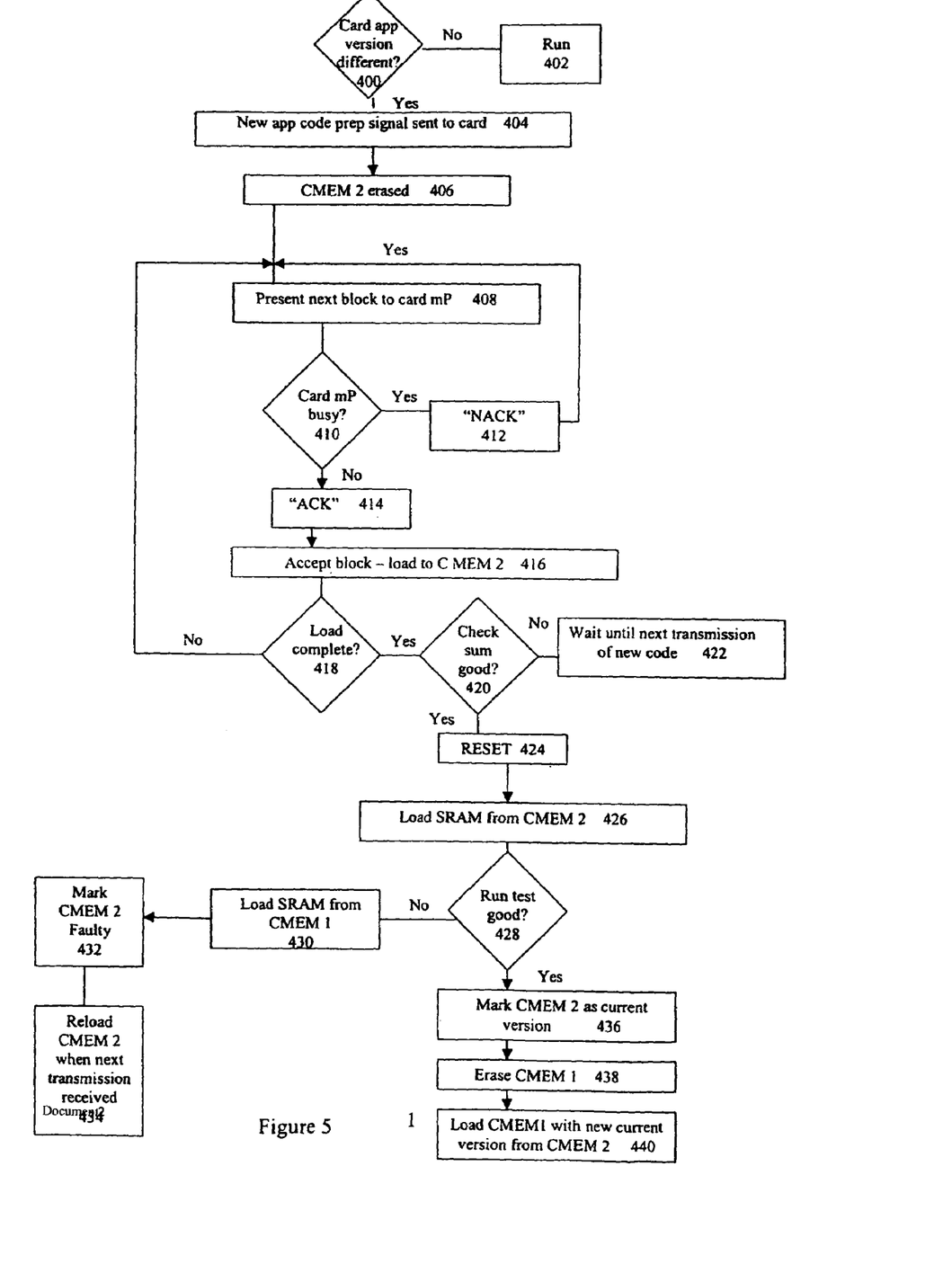
FIG. 5 is a flow chart for updating an option card.

If the software update is designated as option card code, the new code is loaded to memory 3, 176 at Step 306. Thereafter, option card software updating is depicted in FIG. 5.

If the new software update is an application program for the IRD, the first memory 172 is erased at Step 308. Thereafter, the IRD RAM will begin loading packets into first memory 172 at Step 312. Thereafter, a next packet is loaded into first memory 172 at Step 316. After each packet is loaded, a 'download complete' check is made at Step 318. If the last packet loaded was the last packet of code for the new application program update, a CRC check for the download is run at Step 320. If the last packet check 318 indicates that the new program update is not finished, the RAM proceeds to load the next packet at Step 316.

The CRC check will indicate that the new code version is valid or not. If the code is not valid RAM will continue to run its loaded old version of code and the first memory will simply hold the invalid new version until the process begins with the next transmission at Step 322. Reloading with the next transmission proceeds by loading the assembling packets in RAM as described above, checking each next packet against the packets currently stored in memory 1 and replacing that packet if the stored block in memory 1 is corrupt, as indicated at Step 324. This process repeats as necessary until the last packet is determined at 318.

If, however, the CRC check indicates after complete loading of the code update that the new code is valid, a reset is run at Step 326. RAM is reloaded from the first memory 172 at Step 328. This reloads RAM with the updated code version. The new code version is checked for proper running at Step 330. If the run check is invalid, the RAM is reloaded with the old code version from the second memory 174 at Step 332. In either case the header byte is appropriately marked as valid 336 or invalid 334.

FIG. 5 is a flow chart depicting the procedure for updating code in an option card. Either through power up or periodic checking, the version of the application program in question that is currently loaded in the card is checked against the application program version stored in the IRD third memory 176 at Step 400. If they are the same, the application program is run as loaded 402. If they are different, the RD RAM 180 sends the card processor a new Application Code Preparation Message at Step 404. In response to this signal the card microprocessor erases CMEM 2, 234 at Step 406.

Thereafter, the RD RAM will present to the option card the new program code update in a block-by-block fashion at Step 408. As each new block is presented, the microprocessor and input buffer of the card will either be busy executing its music/video play functions or not. This is determined at Step 410. If the card does not have input buffer space available because the buffers are occupied with content data, a "NACK" signal 412 is given and the block is dropped. The block has been saved in the RD in a queue and will be presented again after a preconfigured period of time. If the input buffer and the microprocessor of the card are not busy executing content data, an "ACK" signal 414 is given and the card accepts the next block. The next accepted block is loaded to CMEM 2, 234 at Step 416. After each received block it is determined whether or not the software update is complete at Step 418. If not, the next block will be presented, as in Step 408. If the update is complete, a checksum is run at Step 420. If the checksum indicates that the newly loaded new version of code is invalid, that version will be left in CMEM 2, 234 until the next transmission to the IRD of the new code version, as reflected at Step 422. If, however, the check sum indicates that the newly loaded code version is valid, a reset occurs, 424.

Simple checksums, as opposed to more processing intensive CRCs are used for card downloads. The relatively low chances of corrupted communication between the IRD and card make this acceptable. The use of checksum allows less powerful, less expensive components to be used. Moreover, offset addressing is not used here as it was in IRD downloading, because in the event of a power loss or other mishap during downloading, upon re-start the CSOC 200 can determine which blocks have been already written, and which are corrupted. Of course, it is within the scope of the present invention to use either technique for card downloading as well as IRD downloading.

Upon reset the card SRAM is loaded from CMEM 2 at Step 426. This loads the card SRAM 220 with the new code version. A run test is executed 428. If the run test indicates that the new code version is invalid, the SRAM is reloaded from CMEM 1, 232 at Step 430. Thus, if an update fails, a functioning version of code is available and the function is not interrupted. After function continues with the old version of code from CMEM 1, 232, the corrupted new version of code in CMEM 2 234 is marked as faulty at 432. CMEM 2, 234 will be reloaded when the next transmission of a code update is received from the IRD, Step 434.

If, however, the run test indicates that the new code update is valid, the CMEM 2, 234 new version is marked as the current version at Step 436. Thereafter, CMEM 1, 232 will be erased at Step 438 and the new current version will be loaded into CMEM 1 at Step 440. The newly loaded CMEM 1 will be designated as the backup while CMEM 2 is designated as the current application memory for reloading SRAM in the event of a power failure or other occurrence requiring a new power up.

The updating procedures for the IRD and for the option card described in the proceeding two Figures is initiated either upon power up or upon a periodic check. Power up procedure is depicted in the Flow Chart of FIG. 6. Upon a power up the IRD application program version stored in first memory 172 is checked for validity 502. If it is valid, the application program is loaded to RAM from MEM 1, 172 and run, 504. Optionally, a run check may be performed as well. If it is not valid, or if the run check fails, the version stored in MEM 2, 174, which is the backup version, is loaded to RAM 506.

Figure 6:
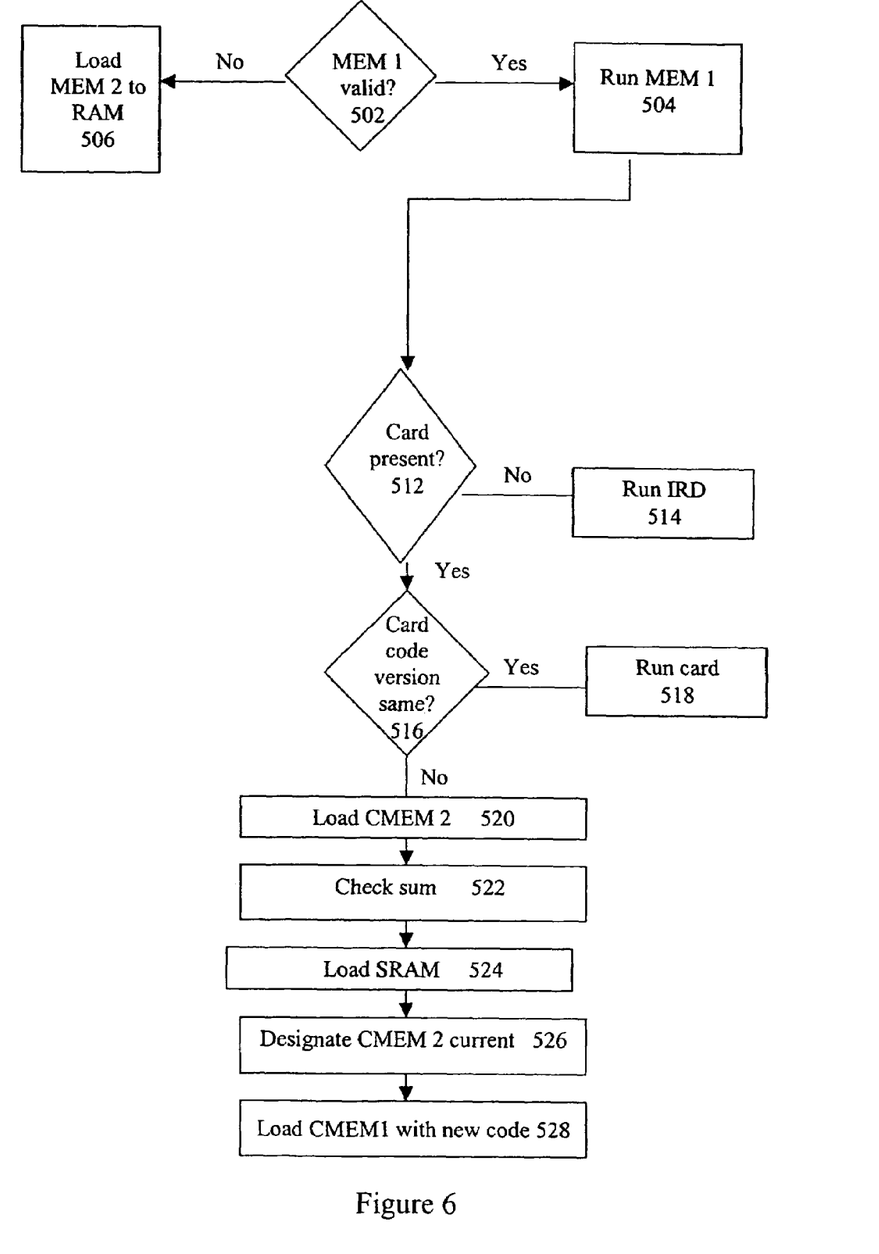
FIG. 6 is a flow chart for power up procedure.

Next the power up procedure checks for the presence of an option card 512. If no card is present the functions and application programs are run through the IRD 514. If a card is present, the version of option card code being run in the card is checked for version equivalence with the application program version stored in third IRD memory 176 at Step 516. If the versions are the same, both the IRD and the card run with the current versions 518. If the IRD options card code version is different then the option card stored version, then CMEM 2, 234 is loaded with the new version from the IRD at Step 520, as described in detail in FIG. 5. As is also described, the check sum is run 522, SRAM is loaded 524, the CMEM 2, 234 version is designated as the current version 526 and CMEM 1, 232 is loaded with the new code 528.

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. In a broadcast system for distributing content data, a method for updating operational code in a module in operative communication with a receiver, said method comprising:

storing in a first memory a first version of an application program, said first memory being in said module;

storing in a second memory said first version of said application program, said second memory being in said module;

transmitting an updated version of said application program to said receiver;

storing said updated version of said application program in a third memory in said receiver;

erasing said first memory;

transferring said updated version from said third memory to said first memory;

resetting said module of said receiver; and if said updated version of said application program is invalid, loading said first version of the application program from said second memory to a RAM (random access memory) for running the application program.

2. The method of claim 1, further comprising replacing said first version of said application program with said updated version of said application program in said second memory.

3. The method of claim 2, wherein said step of replacing is only when said updated version of said application program is marked as current.

4. The method of claim 1, wherein said transferring step transfers a single block of code at a time.

5. The method of claim 4, wherein each of said single blocks is received into said module when said module is free to receive each of said single blocks.

6. The method of claim 5, wherein a last sent block is resent to said module after said module has not been free for receiving said last sent block.

7. The method of claim 1, wherein said module is an option card.

8. The method of claim 1, further comprising performing a checksum on each of said blocks.

9. The method of claim 1, further comprising checking operation of said updated version of said application program.

10. The method of claim 1, further comprising marking said updated version of said application as untested.

11. The method of claim 1, further comprising marking said updated version of said application program as corrupt.

12. The method of claim 1, further comprising marking said updated version of said application program as current.

13. The method of claim 12, wherein said current marking is stored in said first memory.

14. The method of claim 1, wherein said first version of said application program is marked as obsolete.

15. The method of claim 1, further comprising retransmitting said updated version of said application program and loading said retransmitted updated version in said first memory.

16. The method of claim 15, wherein said retransferring of said updated version of said application program is when said updated version in said first memory is marked as corrupt.

17. The method of claim 16, wherein said retransferred updated version of said application program in said first memory is replaced, said replacing being only of corrupted blocks.

18. In a digital content data processor configured to receive a compressed multiplexed data transport stream and configured to output content data, an operational code update apparatus comprising:

an option card interface;

an update control module configured to receive and route operational code updates;

a first memory configured to store a current version of an operational code application;

a second memory configured to store a backup current version of the operational code application;

a third memory configured to store an option card update of an operational code application to be executed by an option card;

a fourth memory for a loading code;

an input buffer;

an output buffer;

said option card interface, said update control module, said first memory, said second memory, said third memory, said fourth memory, said input buffer and said output buffer all being in operational communication;

said update control module being configured to validate that a download of an operational code update is accurate, and when the download is accurate being further configured to erase said first memory and to store the download in said first memory, and being further configured to load said update in a RAM (random access memory), and being further configured to validate that the operational code update is functional, and, when said operational code update is validated as functional, being further configured to erase said second memory and store said operational code update in said second memory as a backup and being further configured such that if either said first validation that the download is accurate or said second validation that the update is functional fails, to load the current version stored in said second memory to the RAM;

said update control module being further configured such that when a service interrupt occurs after said first memory is erased, upon re-initiation of service, the RAM is reloaded with the current version of the operational code application from said second memory; and said update control module being further configured to forward a download of the option card update to said third memory and being further configured to load the option card update to said option card interface from said third memory.

19. The apparatus of claim 18 wherein said update control module is further configured to validate that a download of an option card update is accurate.

20. The apparatus of claim 18 wherein said update control module is further configured to erase said third memory when said update control module receives a signal from said option card interface that an option card update is completely loaded in the option card and functional.

21. The apparatus of claim 18 wherein the download of the operational code update is received via digital satellite transmission.

22. The apparatus of claim 18 wherein said update control module is further configured to determine if the download of the operational code is to be received by that individual digital content data processor according to a control instruction in the data transport stream.

23. The apparatus of claim 18 wherein said update control module stores an option card update in said third memory while the option card is not installed.

24. The apparatus of claim 18 wherein the download is stored in a flash memory and wherein the download is stored in said first memory after said verification that the download is accurate.

25. The apparatus of claim 18 wherein said update control module is further configured to check application version numbers upon power up and to load an updated version of the operational code application to RAM when a current version of operational code application stored in said first memory is a different version than the operational code application stored in said second memory.

26. The apparatus of claim 18 wherein said update control module is further configured to check a version of an operational code application stored in an installed option card upon power up and to send an option card update from said third memory to said option card interface when said version stored in said third memory is a different version than the version stored in said option card.

27. The apparatus of claim 18 wherein said update control module is further configured to queue blocks of an option card update for an option card and to send them to said option card interface at a set time interval and when said option interface indicates that the option card input buffer can receive a next block, transferring the next block to the option card and when said option card interface signals that an option card input buffer is full with content data being processed, then retaining the next block of the option card update in said queue.

28. The apparatus of claim 18 wherein said update control module marks an operational code application as a current version after said validation that the operational application functions in said RAM.

29. The apparatus of claim 18 said apparatus being further configured to operate in a device selected from the group consisting of:

a personal computer, a personal digital assistant, a radio, a television and a wireless telephone.

30. The apparatus of claim 18 wherein said apparatus operates in an integrated receiver decoder.

31. The apparatus of claim 18 wherein said apparatus is embodied in hardware selected from the group consisting of: an SOC (System On a Chip), a CSOC (Configurable System On a Chip), an field programmable gate array and an application specific integrated chip.

32. The apparatus of claim 18 wherein said input buffers and output buffers are in the range of substantially about 2,000 to about substantially about 8,000 bytes in capacity.

33. The apparatus of claim 18 wherein said apparatus configures RAM to regroup data packets comprising the operational code application update from a data transport stream into blocks.

34. The apparatus of claim 33 being configured to perform a cyclic redundancy check for each of said blocks.

35. The apparatus of claim 33 being further configured to assign an offset memory address for each block to be stored in each of said memories.

36. The apparatus of claim 33 being further configured to drop corrupted blocks.

37. The apparatus of claim 33 being further configured to store uncorrupted blocks and to leave blank memory corresponding to offset memory addresses for which corrupted blocks were received.

38. The apparatus of claim 33 being further configured upon retransmission of an update, to restore only blocks corresponding to empty memory addresses, said addresses corresponding to blocks corrupted during a previous download.

39. The apparatus of claim 18 being further configured to perform a cyclic redundancy check of an entire download.

40. The apparatus of claim 18 wherein said first memory and said second memory alternate after each download.

41. The apparatus of claim 18 being further configured to notify an operator through a display in the event of an invalid download.

42. The apparatus of claim 18 further comprising a checksum for option card loading.

43. The apparatus of claim 18 being further configured to up load an unvalidated option card update to SRAM in the option card upon a next power up or reset.

44. The apparatus of claim 43 being further configured to validate that an option card update is functional upon said upload and to thereafter mark in said third memory that the option card update as current.

45. An option card for a digital content data processor configured to receive compressed multiplexed data transmission streams and to output content data, said option card comprising:
 an input buffer;
 an output buffer;
 a first flash memory;
 a second flash memory;
 a RAM;
 a first memory;
 a second memory;
 a third memory;
 said input buffer, output buffer, first flash memory, second flash memory, RAM, first memory, second memory, and third memory all being in operative communication with each other and with an interface for an option card slot;
 said option card being configured to load the RAM from said first memory upon power up, to erase said first memory and store an update in said first memory when an update is received, when a service interruption occurs during a download, to reload the RAM from said second memory.

46. The apparatus of claim 45 wherein said apparatus is configured to receive the operational code application update from an option card interface in blocks.

47. The apparatus of claim 46 being configured to perform a check sum for each of said blocks.

48. The apparatus of claim 45 being further configured to perform a cyclic redundancy check of an entire download.

49. The apparatus of claim 45 being further configured to assign an offset memory address for each block to be stored in each of said memories.

50. The apparatus of claim 45 being further configured to drop corrupted blocks.

51. The apparatus of claim 45 being further configured to store uncorrupted blocks and to leave blank memory corresponding to offset memory addresses for which corrupted blocks were received.

52. The apparatus of claim 45 being further configured such that upon retransmission of an update, to restore only blocks corresponding to empty memory addresses, said addresses corresponding to blocks corrupted during a previous download.

53. The apparatus of claim 45 wherein said first memory and said second memory alternate after each download.

54. The apparatus of claim 45 being further configured to notify an operator through a display in the event of an invalid download.

55. The apparatus of claim 45 being further configured to up load an unvalidated option card update to SRAM in the option card upon a next power up or reset.

56. The apparatus of claim 45 being further configured to validate that an option card update is functional upon said upload and to thereafter mark in said third memory the option card update as current.

* * * * *

UNITED STATES PATENT AND TRADEMARK OFFICE
CERTIFICATE OF CORRECTION

PATENT NO.        : 7,171,606 B2                                         Page 1 of 1
APPLICATION NO.   : 10/400972
DATED             : January 30, 2007
INVENTOR(S)       : Dennis Blackburn and Kenneth Osburn It is certified that error appears in the above-identified patent and that said Letters Patent is hereby corrected as shown below:

Column 2, line 38: "U.S. Pat. No. 5,985,895" should read --U.S. Pat No. 4,985,895--; and
Column 6, line 1: "U.S. Pat. No. 5,985,895" should read --U.S. Pat No. 4,985,895--

Signed and Sealed this

Twelfth Day of August, 2008

JON W. DUDAS
*Director of the United States Patent and Trademark Office*